US010500786B2

(12) United States Patent
Rolland

(10) Patent No.: US 10,500,786 B2
(45) Date of Patent: *Dec. 10, 2019

(54) DUAL CURE RESINS CONTAINING MICROWAVE ABSORBING MATERIALS AND METHODS OF USING THE SAME

(71) Applicant: Carbon, Inc., Redwood City, CA (US)

(72) Inventor: Jason P. Rolland, San Carlos, CA (US)

(73) Assignee: Carbon, Inc., Redwood City, CA (US)

( * ) Notice: Subject to any disclaimer, the term of this patent is extended or adjusted under 35 U.S.C. 154(b) by 326 days.

This patent is subject to a terminal disclaimer.

(21) Appl. No.: 15/626,787

(22) Filed: Jun. 19, 2017

(65) Prior Publication Data

US 2017/0368740 A1     Dec. 28, 2017

Related U.S. Application Data

(60) Provisional application No. 62/353,771, filed on Jun. 23, 2016, provisional application No. 62/353,312, filed on Jun. 22, 2016.

(51) Int. Cl.
| | |
|---|---|
| *B29C 33/52* | (2006.01) |
| *B29C 71/04* | (2006.01) |
| *B29C 64/106* | (2017.01) |
| *B29C 35/08* | (2006.01) |
| *B33Y 70/00* | (2015.01) |
| *B29C 64/277* | (2017.01) |
| *B29C 64/40* | (2017.01) |
| *B29C 33/44* | (2006.01) |
| *B29C 64/124* | (2017.01) |
| *B33Y 10/00* | (2015.01) |
| *B29K 105/00* | (2006.01) |

(52) U.S. Cl.
CPC .......... *B29C 64/106* (2017.08); *B29C 33/448* (2013.01); *B29C 35/0805* (2013.01); *B29C 64/124* (2017.08); *B29C 64/277* (2017.08); *B29C 64/40* (2017.08); *B33Y 70/00* (2014.12); *B29C 2035/0827* (2013.01); *B29C 2035/0833* (2013.01); *B29C 2035/0855* (2013.01); *B29K 2105/0002* (2013.01); *B33Y 10/00* (2014.12)

(58) Field of Classification Search
CPC ................. B29C 33/448; B29C 33/52; B29C 2035/0855; B29C 64/124; B29C 64/277; B29C 64/40; B29C 71/04
USPC .......................... 264/236, 313, 317, 401, 489
See application file for complete search history.

(56) References Cited

U.S. PATENT DOCUMENTS

| | | | |
|---|---|---|---|
| 4,020,156 A | 4/1977 | Murray et al. | |
| 4,626,642 A | 12/1986 | Wang et al. | |
| 5,160,677 A | 11/1992 | Gravener et al. | |
| 5,160,678 A * | 11/1992 | Gravener | A61B 17/0643 |
| | | | 264/313 X |
| 5,189,078 A | 2/1993 | Johnson et al. | |
| 5,192,559 A | 3/1993 | Hull et al. | |
| 5,236,637 A | 8/1993 | Hull | |
| 5,264,061 A | 11/1993 | Juskey et al. | |
| 5,418,112 A | 5/1995 | Mirle et al. | |
| 5,629,133 A | 5/1997 | Wolf et al. | |
| 5,674,921 A | 10/1997 | Regula et al. | |
| 5,679,719 A | 10/1997 | Klemarczyk et al. | |
| 5,695,708 A | 12/1997 | Karp et al. | |
| 6,106,747 A | 8/2000 | Wohlwend | |
| 6,155,331 A | 12/2000 | Langer et al. | |
| 6,309,797 B1 | 10/2001 | Grinevich et al. | |
| 6,566,414 B2 | 5/2003 | Takeshima et al. | |
| 7,105,584 B2 | 9/2006 | Chambers et al. | |
| 7,273,580 B2 | 9/2007 | Kirsten et al. | |
| 7,438,846 B2 | 10/2008 | John | |
| 7,892,474 B2 | 2/2011 | Shkolnik et al. | |
| 8,991,211 B1 | 3/2015 | Arlotti et al. | |
| 9,453,142 B2 | 9/2016 | Rolland et al. | |
| 9,598,606 B2 | 3/2017 | Rolland et al. | |
| 9,676,963 B2 | 6/2017 | Rolland et al. | |
| 9,708,440 B2 | 7/2017 | Das et al. | |
| 9,777,097 B2 | 10/2017 | Liu et al. | |
| 9,982,164 B2 | 5/2018 | Rolland et al. | |

(Continued)

FOREIGN PATENT DOCUMENTS

| | | |
|---|---|---|
| CN | 103571211 | 2/2014 |
| EP | 0442071 | 8/1991 |

(Continued)

OTHER PUBLICATIONS

Kessler M.R. "Cyanate Ester Resins", Wiley Encyclopedia of Compositions, Second Edition (2012), p. 1-15.*

(Continued)

*Primary Examiner* — Leo B Tentoni
(74) *Attorney, Agent, or Firm* — Myers Bigel, P.A.

(57) ABSTRACT

Provided herein according to some embodiments is a method of forming a three-dimensional intermediate object with a polymerizable liquid, said polymerizable liquid comprising a mixture of (i) a microwave absorbing material, (ii) a light polymerizable liquid first component, and (iii) a second solidifiable component that is different from said first component. Optionally, but in some embodiments preferably, the method includes supporting the three-dimensional intermediate with a separate support media prior to solidifying and/or curing the second solidifiable component in the three-dimensional intermediate to form the three-dimensional object; and then optionally separating said support media when present from said three-dimensional object.

28 Claims, No Drawings

(56) References Cited

U.S. PATENT DOCUMENTS

| | | |
|---|---|---|
| 10,155,882 B2 | 12/2018 | Rolland et al. |
| 10,240,066 B2 | 3/2019 | Rolland et al. |
| 2003/0091833 A1 | 5/2003 | Baumgart et al. |
| 2004/0052966 A1 | 3/2004 | Wilke et al. |
| 2004/0170923 A1 | 9/2004 | Steinmann et al. |
| 2004/0187714 A1 | 9/2004 | Napadensky |
| 2004/0232583 A1* | 11/2004 | Monsheimer ....... B29C 67/0077 264/489 X |
| 2005/0023710 A1 | 2/2005 | Brodkin et al. |
| 2005/0246435 A1 | 11/2005 | Choudhary et al. |
| 2006/0185255 A1 | 8/2006 | Nevoret et al. |
| 2006/0185256 A1 | 8/2006 | Nevoret et al. |
| 2007/0178133 A1 | 8/2007 | Rolland |
| 2007/0205528 A1 | 9/2007 | Patel et al. |
| 2008/0131692 A1 | 6/2008 | Rolland et al. |
| 2010/0105794 A1 | 4/2010 | Dietliker et al. |
| 2012/0007287 A1 | 1/2012 | Vermeer et al. |
| 2012/0195994 A1 | 8/2012 | El-Siblani et al. |
| 2012/0251841 A1 | 10/2012 | Southwell et al. |
| 2013/0292862 A1 | 11/2013 | Joyce |
| 2013/0295212 A1 | 11/2013 | Chen et al. |
| 2014/0239527 A1 | 8/2014 | Lee |
| 2015/0097315 A1* | 4/2015 | DeSimone ............ B29C 64/124 264/401 |
| 2015/0097316 A1 | 4/2015 | Desimone et al. |
| 2015/0102532 A1 | 4/2015 | Desimone et al. |
| 2015/0322291 A1 | 11/2015 | Salviato et al. |
| 2016/0031157 A1 | 2/2016 | Reep et al. |
| 2016/0137839 A1 | 5/2016 | Rolland et al. |
| 2016/0167299 A1 | 6/2016 | Jallouli et al. |
| 2016/0229123 A1 | 8/2016 | Carlson et al. |
| 2016/0303793 A1 | 10/2016 | Ermoshkin et al. |
| 2016/0366728 A1 | 12/2016 | Folgar et al. |
| 2016/0369040 A1* | 12/2016 | Das ........................ B33Y 70/00 |
| 2017/0113416 A1 | 4/2017 | Desimone et al. |
| 2017/0120515 A1 | 5/2017 | Rolland et al. |
| 2017/0173866 A1 | 6/2017 | Schonenberg et al. |
| 2017/0173872 A1 | 6/2017 | McCall et al. |
| 2017/0173881 A1 | 6/2017 | Dachs, II et al. |
| 2017/0174827 A1 | 6/2017 | Gu et al. |
| 2017/0282400 A1 | 10/2017 | Jie |
| 2017/0368740 A1 | 12/2017 | Rolland |
| 2018/0009162 A1 | 1/2018 | Moore |
| 2018/0015662 A1 | 1/2018 | Ermoshkin et al. |
| 2018/0022034 A1 | 1/2018 | Sutter et al. |
| 2018/0029292 A1 | 2/2018 | Samulski et al. |
| 2018/0229436 A1 | 8/2018 | Gu et al. |

FOREIGN PATENT DOCUMENTS

| | | |
|---|---|---|
| EP | 0525578 | 2/1993 |
| EP | 0562826 | 9/1993 |
| EP | 0830641 | 3/1998 |
| EP | 1341039 | 9/2003 |
| EP | 1918316 | 5/2008 |
| EP | 2224874 | 9/2010 |
| JP | H02111528 | 4/1990 |
| JP | H09194540 | 7/1997 |
| JP | 2000007641 | 1/2000 |
| WO | 92/07705 | 5/1992 |
| WO | 96/00412 | 1/1996 |
| WO | 2001/026023 | 4/2001 |
| WO | 2006/045002 | 4/2006 |
| WO | 2013/021039 | 2/2013 |
| WO | 2014/126834 | 8/2014 |
| WO | 2014/126837 | 8/2014 |
| WO | 2015/077419 | 5/2015 |
| WO | 2015/200173 | 12/2015 |
| WO | 2015/200179 | 12/2015 |
| WO | 2015/200189 | 12/2015 |
| WO | 2015/200201 | 12/2015 |

OTHER PUBLICATIONS

Park et al. "UV- and thermal-curing behaviors or dual-curable adhesives based on epoxy acrylate oligomers" International Journal of Adhesion and Adhesives, 29(7): 710-717 (2009).

Malik et al. "A thermally reworkable UV curable acrylic adhesive prototype" International Journal of Adhesion & Adhesives, 22: 283-289 (2002).

Malik et al. "Thermally Controlled Molecular Disassembly of a Crosslinked Polymer Network by the Incorporation of Sterically Hindered Urea Linkages" Journal of Applied Polymer Science, 85: 856-864 (2002).

Malik et al. "Computational study of thermally controlled polymer network disassembly via the incorporation of sterically hindered urea linkages" Polymer, 43: 2561-2567 (2002).

Malik et al. "The thermally controlled molecular disassembly properties of a polymer network via the incorporation of one sterically hindered urea linkage" Polymer Degradation and Stability, 76: 241-249 (2002).

Malik et al. "Comparative Study of Novel Polymer Prototype for Controlled Thermally Reworkable UV Curable Acrylic Adhesives in Absence and Presence of Reactive Diluent" Surface Engineering, 19(2): 121-126 (2003).

Velankar et al. "High-performance UV-curable urethane acrylates via deblocking chemistry" Journal of Applied Polymer Science, 62(9):1361-1376 (1996).

International Search Report and Written Opinion for PCT/US2016/050049 dated Nov. 2, 2016, 11 pages.

Berg, Gayla J., et al., "A Dual-Cure, Solid-State Photoresist Combining a Thermoreversible Diels-Alder Network and a Chain Growth Acrylate Network," Macromolecules, vol. 47, No. 10, May 27, 2014, pp. 3473-3482.

Tumbleston JR et al. "Continuous liquid interface production of 3D objects" Science, 347(6228): 1349-1352 (2015).

Humiseal (HumiSeal UV40 UV curable conformal coating Technical Datasheet, http://www.humiseal.com/wp-content/uploads/2013/07/UV40-TDS.pdf (available online Jul. 2013, accessed Jul. 31, 2018)).

Kessler, M.R., "Cyanate Ester Resins", Wiley Encyclopedia of Compositions, second Edition. Ed. Luigi Nicolais & Assunta Borzcchiello, 2012, John Wiley & Sons, pp. 1-15.

Pan et al. "A Fast Mask Projection Stereolithography Process for Fabricating Digital Models in Minutes", J. Manufacturing Sci. and Eng. 134(5):051011-1 (2012).

Sun et al. "Study on the Properties of Microwave Curing Epoxy Resin/nano-Fe Composite Materials" Applied Mechanics and Materials, 26-28:356-359 (2010).

Kersting et al. "Evaluation of the Use of Inorganic Pigments and Fillers in Cure of Epoxy Resins by Microwave Irradiation" 2013 International Nuclear Atlantic Conference—INAC 2013, Recife, PE, Brazil, Nov. 24-29, 2013 (13 pp).

* cited by examiner

DUAL CURE RESINS CONTAINING MICROWAVE ABSORBING MATERIALS AND METHODS OF USING THE SAME

RELATED APPLICATIONS

This application claims the benefit of U.S. Provisional Patent Application Ser. No. 62/353,312, filed Jun. 22, 2016, and U.S. Provisional Patent Application Ser. No. 62/353,771, filed Jun. 23, 2016, the disclosures of each of which is incorporated by reference herein in its entirety.

FIELD OF THE INVENTION

The present invention concerns materials, methods and apparatus for the fabrication of solid three-dimensional objects from liquid materials, and objects so produced.

BACKGROUND OF THE INVENTION

In conventional additive or three-dimensional fabrication techniques, construction of a three-dimensional object is performed in a step-wise or layer-by-layer manner. In particular, layer formation is performed through solidification of photo curable resin under the action of visible or UV light irradiation. Two techniques are known: one in which new layers are formed at the top surface of the growing object; the other in which new layers are formed at the bottom surface of the growing object. An early example is Hull, U.S. Pat. No. 5,236,637. Other approaches are shown in U.S. Pat. Nos. 7,438,846, 7,892,474; M. Joyce, US Patent App. 2013/0292862; Y. Chen et al., US Patent App. 2013/0295212 (both Nov. 7, 2013); Y. Pan et al., *J. Manufacturing Sci. and Eng.* 134, 051011-1 (October 2012), and numerous other references. Materials for use in such apparatus are generally limited, and there is a need for new resins which will provide diverse material properties for different product families if three-dimensional fabrication is to achieve its full potential.

Southwell et al., US Patent Application Publication No. 2012/0251841, describe liquid radiation curable resins for additive fabrication, but these comprise a cationic photoinitiator (and hence are limited in the materials which may be used) and are suggested only for layer-by-layer fabrication.

Velankar, Pazos, and Cooper, *Journal of Applied Polymer Science* 162, 1361 (1996), describe UV-curable urethane acrylates formed by a deblocking chemistry, but they are not suggested for additive manufacturing, and no suggestion is made on how those materials may be adapted to additive manufacturing.

SUMMARY OF THE INVENTION

In the course of developing dual cure resins for manufacturing methods in which a three-dimensional intermediate object is produced by additive manufacturing (e.g., continuous liquid interface production or "CLIP"), and the intermediate subsequently cured by, for example, heat and/or microwave irradiation, it has been found that distortion of the final product between the production of the intermediate object and the subsequent cure may sometimes occur for certain geometries.

The present invention provides a method of forming a three-dimensional object, comprising the steps of:

forming a three-dimensional intermediate by additive manufacturing with light cure of a polymerizable liquid, the polymerizable liquid comprising a mixture of (i) a light polymerizable liquid first component, and (ii) a second solidifiable component (e.g., a second reactive component) that is different from the first component (e.g., that does not contain a cationic photoinitiator, or is further solidified by a different physical mechanism, or further reacted, polymerized or chain extended by a different chemical reaction);

optionally, but in some embodiments preferably, supporting the three-dimensional intermediate with a separate support media; then solidifying and/or curing (e.g., further reacting, further polymerizing, further chain extending), the second solidifiable component (e.g., the second reactive component) in the three-dimensional intermediate to form the three-dimensional object (in the particulate media when present); and then separating the support media (when present) from the three-dimensional object.

In some embodiments of the foregoing, the step of forming the three-dimensional intermediate is carried out by:

(a) providing a carrier and an optically transparent member having a build surface, the carrier and the build surface defining a build region therebetween;

(b) filling the build region with a polymerizable liquid, the polymerizable liquid comprising a mixture of (i) a light polymerizable liquid first component, and (ii) a second solidifiable component (e.g., a second reactive component) that is different from the first component (e.g., that does not contain a cationic photoinitiator, or is further solidified by a different physical mechanism, or further reacted, polymerized or chain extended by a different chemical reaction); and (c) irradiating the build region with light through the optically transparent member to form a solid polymer scaffold from the first component and also advancing the carrier away from the build surface to form a three-dimensional intermediate having the same shape as, or a shape to be imparted to, the three-dimensional object and containing the second solidifiable component (e.g., a second reactive component) carried in the scaffold in unsolidified and/or uncured form.

In some embodiments, the media is a solid particulate.

In some embodiments, the media is flowable.

In some embodiments, the media is inert.

In some embodiments, the media is water soluble.

In some embodiments, the media is comprised of an inorganic salt such as sodium chloride, sodium bicarbonate, sodium carbonate, sodium sulfate, sodium sulfite, sodium iodide, sodium bromide, magnesium sulfate, magnesium carbonate, magnesium bromide, magnesium iodide, calcium chloride, calcium carbonate, calcium bromide, calcium sulfate, calcium iodide, potassium carbonate, potassium chloride, potassium bromide, potassium iodide, potassium nitrate, ammonium sulfate, ammonium chloride, ammonium bromide, ammonium iodide, or a combination thereof.

In some embodiments, the media comprises a microwave absorbing material, such as iron particles or nanoparticles, to facilitate heating of the object by microwave irradiating.

In some embodiments, the polymerizable liquid comprises a microwave absorbing material, such as iron particles or nanoparticles, to facilitate heating of the object by microwave irradiating.

In some embodiments, both the media and the polymerizable liquid comprise a microwave absorbing material, both to facilitate the heating of the object by microwave irradiating.

In some embodiments, the separating step is carried out by dissolving or solubilizing the media with water.

In some embodiments, the solidifying and/or curing step is carried out by heating and/or microwave irradiating (e.g., heating by microwave irradiating).

In some embodiments, the three-dimensional intermediate is collapsible, compressible, or elastic.

In some embodiments, the three-dimensional intermediate is formed by continuous liquid interface production (CLIP).

In some embodiments, the second component comprises: (i) a polymerizable liquid solubilized in or suspended in the first component; (ii) a polymerizable solid suspended in the first component; (iii) a polymerizable solid solubilized in the first component; or (iv) a polymer solubilized in the first component.

In some embodiments, the polymerizable liquid comprises: from 1 or 10 percent by weight to 40, 90 or 99 percent by weight of the first component; and from 1, 10 or 60 percent by weight to 90 or 99 percent by weight of the second component.

In some embodiments, the solidifying and/or curing step (e.g., the further reacting, further polymerizing, or further chain extending step) is carried out subsequent to the irradiating step (c) and is carried out by: (i) heating the second solidifiable component (e.g., second reactive component); (ii) irradiating the second solidifiable component (e.g., second reactive component) with light at a wavelength different from that of the light in the irradiating step (c); (iii) contacting the second polymerizable component to water; or (iv) contacting the second polymerizable component to a catalyst.

In some embodiments, the second component comprises the precursors to a polyurethane, polyurea, or copolymer thereof, a silicone resin, an epoxy resin, a cyanate ester resin, or a natural rubber; and the solidifying step is carried out by heating.

In some embodiments, the second component comprises the precursors to a polyurethane, polyurea, or copolymer thereof, and the solidifying and/or curing step (e.g., further reacting, further polymerizing, or further chain extending) is carried out by contacting the second component to water.

In some embodiments, the solidifying and/or curing step (e.g., the further reacting, further polymerizing, or further chain extending step) is carried out under conditions in which the solid polymer scaffold degrades and forms a constituent necessary for the polymerization of the second component.

In some embodiments, the second component comprises precursors to a polyurethane, polyurea, or copolymer thereof, a silicone resin, a ring-opening metathesis polymerization resin, a click chemistry resin, or a cyanate ester resin, and the solidifying and/or curing step is carried out by contacting the second component to a polymerization catalyst.

In some embodiments, the polymerizable liquid comprises a first component (Part A) and at least one additional component (Part B), the first component comprising monomers and/or prepolymers that can be polymerized by exposure to actinic radiation or light; the second component solidifiable on contacting to heat, water, water vapor, light at a different wavelength than that at which the first component is polymerized, catalysts, evaporation of a solvent from the polymerizable liquid, exposure to microwave irradiation, or a combination thereof.

In some embodiments, the first component monomers and/or prepolymers comprise reactive end groups selected from the group consisting of acrylates, methacrylates, α-olefins, N-vinyls, acrylamides, methacrylamides, styrenics, epoxides, thiols, 1,3-dienes, vinyl halides, acrylonitriles, vinyl esters, maleimides, and vinyl ethers.

In some embodiments, the additional component comprises monomers and/or prepolymers comprising reactive end groups selected from the group consisting of: epoxy/amine, epoxy/hydroxyl, oxetane/amine, oxetane/alcohol, isocyanate/hydroxyl, isocyanate/amine, isocyanate/carboxylic acid, cyanate ester, anhydride/amine, amine/carboxylic acid, amine/ester, hydroxyl/carboxylic acid, hydroxyl/acid chloride, amine/acid chloride, vinyl/Si—H, Si—Cl/hydroxyl, Si—Cl/amine, hydroxyl/aldehyde, amine/aldehyde, hydroxymethyl or alkoxymethyl amide/alcohol, aminoplast, alkyne/azide, click chemistry reactive groups, alkene/sulfur, alkene/thiol, alkyne/thiol, hydroxyl/halide, isocyanate/water, Si—OH/hydroxyl, Si—OH/water, Si—OH/Si—H, Si—OH/Si—OH, perfluorovinyl, diene/dienophiles, olefin metathesis polymerization groups, olefin polymerization groups for Ziegler-Natta catalysis, and ring-opening polymerization groups and mixtures thereof.

In some embodiments, the three-dimensional object is comprised of polyurethane, polyurea, or copolymer thereof; and the polymerizable liquid is comprised of at least one of: (i) a blocked or reactive blocked prepolymer, (ii) a blocked or reactive blocked diisocyante, and/or (iii) a blocked or reactive blocked diisocyanate chain extender.

In some embodiments, the polymerizable liquid comprises:
  (a) a mixture of (i) a blocked or reactive blocked prepolymer, (ii) a chain extender, (iii) a photoinitiator, (iv) optionally a polyol and/or a polyamine, (v) optionally a reactive diluent, (vi) optionally a pigment or dye, and (vii) optionally a filler; or
  (b) a mixture of (i) a blocked or reactive blocked diisocyanate, (ii) a polyol and/or polyamine, (iii) a chain extender, (iv) a photoinitiator, (v) optionally a reactive diluent (vi) optionally a pigment or dye, and (vii) optionally a filler; or
  (c) a mixture of (i) a polyol and/or polyamine, (ii) a blocked or reactive blocked diisocyanate chain extender, (iii) optionally one or more additional chain extenders, (iv) a photoinitiator, (v) optionally a reactive diluent, (vi) optionally a pigment or dye, and (vii) optionally a filler.

In some embodiments, the three-dimensional object comprises a polymer blend, interpenetrating polymer network, semi-interpenetrating polymer network, or sequential interpenetrating polymer network formed from the first component and the second component.

In some embodiments, where the three-dimensional object comprises an interpenetrating polymer network (IPN), the interpenetrating polymer network comprises a sol-gel composition, a hydrophobic-hydrophilic IPN, a phenolic resin, a polyimide, a conductive polymer, a natural product-based IPN, a sequential IPN, a semi IPN, a polyolefin, or a combination thereof.

In some embodiments, the irradiating and/or the advancing steps are carried out while also concurrently: (i) continuously maintaining a dead zone of polymerizable liquid in contact with the build surface, and (ii) continuously maintaining a gradient of polymerization zone between the dead zone and the solid polymer and in contact with each thereof, the gradient of polymerization zone comprising the first component in partially-cured form.

In some embodiments, of the foregoing, the optically transparent member comprises a semipermeable member, and the continuously maintaining a dead zone is carried out by feeding an inhibitor of polymerization through the optically transparent member, thereby creating a gradient of inhibitor in the dead zone and optionally in at least a portion of the gradient of polymerization zone.

In some embodiments of the foregoing, the optically transparent member comprises a fluoropolymer.

In some embodiments of the foregoing, the first component comprises a free radical polymerizable liquid and the inhibitor comprises oxygen; or the first component comprises an acid-catalyzed or cationically polymerizable liquid, and the inhibitor comprises a base.

Some embodiments of the foregoing further comprise vertically reciprocating the carrier with respect to the build surface to enhance or speed the refilling of the build region with the polymerizable liquid.

Non-limiting examples and specific embodiments of the present invention are explained in greater detail in the specification set forth below. The disclosures of all United States patent references cited herein are to be incorporated herein by reference in their entirety.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations of one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly-used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

"Shape to be imparted to" refers to the case where the shape of the intermediate object slightly changes between formation thereof and forming the subsequent three-dimensional product, typically by shrinkage (e.g., up to 1, 2 or 4 percent by volume), expansion (e.g., up to 1, 2 or 4 percent by volume), removal of support structures, or by intervening forming steps (e.g., intentional bending, stretching, drilling, grinding, cutting, polishing, or other intentional forming after formation of the intermediate product, but before formation of the subsequent three-dimensional product).

I. Polymerizable Liquids: Part A

Dual cure systems as described herein may include a first curable system (sometimes referred to as "Part A" herein) that is curable by actinic radiation, typically light, and in some embodiments ultraviolet (UV) light. Any suitable polymerizable liquid can be used as the first component. The liquid (sometimes also referred to as "liquid resin" "ink," or simply "resin" herein) can include a monomer, particularly photopolymerizable and/or free radical polymerizable monomers, and a suitable initiator such as a free radical initiator, and combinations thereof. Examples include, but are not limited to, acrylics, methacrylics, acrylamides, styrenics, olefins, halogenated olefins, cyclic alkenes, maleic anhydride, alkenes, alkynes, carbon monoxide, functionalized oligomers, multifunctional cure site monomers, functionalized PEGs, etc., including combinations thereof. Examples of liquid resins, monomers and initiators include but are not limited to those set forth in U.S. Pat. Nos. 8,232,043; 8,119,214; 7,935,476; 7,767,728; 7,649,029; WO 2012129968 A1; CN 102715751 A; JP 2012210408 A.

Acid Catalyzed Polymerizable Liquids.

While in some embodiments as noted above the polymerizable liquid comprises a free radical polymerizable liquid (in which case an inhibitor may be oxygen as described below), in other embodiments the polymerizable liquid comprises an acid catalyzed, or cationically polymerized, polymerizable liquid. In such embodiments the polymerizable liquid comprises monomers contain groups suitable for acid catalysis, such as epoxide groups, vinyl ether groups, etc. Thus suitable monomers include olefins such as methoxyethene, 4-methoxystyrene, styrene, 2-methylprop-1-ene, 1,3-butadiene, etc.; heterocycloic monomers (including lactones, lactams, and cyclic amines) such as oxirane, thietane, tetrahydrofuran, oxazoline, 1,3, dioxepane, oxetan-2-one, etc., and combinations thereof. A suitable (generally ionic or non-ionic) photoacid generator (PAG) is included in the acid catalyzed polymerizable liquid, examples of which include, but are not limited to, onium salts, sulfonium and iodonium salts, etc., such as diphenyl iodide hexafluorophosphate, diphenyl iodide hexafluoroarsenate, diphenyl iodide hexafluoroantimonate, diphenyl p-methoxyphenyl triflate, diphenyl p-toluenyl triflate, diphenyl p-isobutylphenyl triflate, diphenyl p-tert-butylphenyl triflate, triphenylsulfonium hexafluororphosphate, triphenylsulfonium hexafluoroarsenate, triphenylsulfonium hexafluoroantimonate, triphenylsulfonium triflate, dibutylnaphthylsulfonium triflate, etc., including mixtures thereof. See, e.g., U.S. Pat. Nos. 7,824,839; 7,550,246; 7,534,844; 6,692,891; 5,374,500; and 5,017,461; see also *Photoacid Generator Selection Guide for the electronics industry and energy curable coatings* (BASF 2010).

Hydrogels.

In some embodiments suitable resins includes photocurable hydrogels like poly(ethylene glycols) (PEG) and gelatins. PEG hydrogels have been used to deliver a variety of biologicals, including growth factors; however, a great challenge facing PEG hydrogels crosslinked by chain growth polymerizations is the potential for irreversible protein damage. Conditions to maximize release of the biologicals from photopolymerized PEG diacrylate hydrogels can be enhanced by inclusion of affinity binding peptide sequences in the monomer resin solutions prior to photopolymerization allowing sustained delivery. Gelatin is a biopolymer frequently used in food, cosmetic, pharmaceutical and photographic industries. It is obtained by thermal denaturation or chemical and physical degradation of collagen. There are three kinds of gelatin, including those found in animals, fish and humans. Gelatin from the skin of cold water fish is considered safe to use in pharmaceutical applications. UV or visible light can be used to crosslink appropriately modified gelatin. Methods for crosslinking gelatin include cure derivatives from dyes such as Rose Bengal.

Photocurable Silicone Resins.

A suitable resin includes photocurable silicones. UV cure silicone rubber, such as Siliopren™ UV Cure Silicone Rubber can be used as can LOCTITE™ Cure Silicone adhesives sealants. Applications include optical instruments, medical and surgical equipment, exterior lighting and enclosures, electrical connectors/sensors, fiber optics and gaskets.

Biodegradable Resins.

Biodegradable resins are particularly important for implantable devices to deliver drugs or for temporary performance applications, like biodegradable screws and stents (U.S. Pat. Nos. 7,919,162; 6,932,930). Biodegradable copolymers of lactic acid and glycolic acid (PLGA) can be dissolved in PEG dimethacrylate to yield a transparent resin suitable for use. Polycaprolactone and PLGA oligomers can be functionalized with acrylic or methacrylic groups to allow them to be effective resins for use.

Photocurable Polyurethanes.

A particularly useful resin is photocurable polyurethanes (including polyureas, and copolymers of polyurethanes and polyureas (e.g., poly(urethane-urea)). A photopolymerizable polyurethane/polyurea composition comprising (1) a polyurethane based on an aliphatic diisocyanate, poly(hexamethylene isophthalate glycol) and, optionally, 1,4-butanediol; (2) a polyfunctional acrylic ester; (3) a photoinitiator; and (4) an anti-oxidant, can be formulated so that it provides a hard, abrasion-resistant, and stain-resistant material (U.S. Pat. No. 4,337,130). Photocurable thermoplastic polyurethane elastomers incorporate photoreactive diacetylene diols as chain extenders.

Additionally photocurable urethane acrylate resins are particularly useful. These resins comprise an oligomeric diol, for example, poly (tetramethylene oxide) diol, that is first end-capped with a diisocyanate, for example isophorone diisocyanate. This resulting prepolymer is made photocurable by subsequent reaction with a monomer containing both a vinyl functionality and a second functional group that will react with an isocyanate. For example, 2-hydroxy ethyl acrylate can be added to the prepolymer to yield a photocurable urethane acrylate. A variety of materials can be made by varying the diol composition and molecular weight, the isocyaante composition and ratio to the diol, and the composition of the reactive monomer. Optionally, these urethane acrylates can be blended with a reactive diluent, for example, isobornyl acrylate, to lower viscosity and further adjust properties.

High Performance Resins.

In some embodiments, high performance resins are used. Such high performance resins may sometimes require the use of heating to melt and/or reduce the viscosity thereof, as noted above and discussed further below. Examples of such resins include, but are not limited to, resins for those materials sometimes referred to as liquid crystalline polymers of esters, ester-imide, and ester-amide oligomers, as described in U.S. Pat. Nos. 7,507,784; 6,939,940. Since such resins are sometimes employed as high-temperature thermoset resins, in the present invention they further comprise a suitable photoinitiator such as benzophenone, anthraquinone, and/or fluoroenone initiators (including derivatives thereof), to initiate cross-linking on irradiation, as discussed further below.

Additional Example Resins.

Particularly useful resins for dental applications include EnvisionTEC's Clear Guide, EnvisionTEC's E-Denstone Material. Particularly useful resins for hearing aid industries include EnvisionTEC's E-SHELL® 300 Series of resins. Particularly useful resins include EnvisionTEC's HTM140IV High Temperature Mold Material for use directly with vulcanized rubber in molding/casting applications. A particularly useful material for making tough and stiff parts includes EnvisionTEC's RC31 resin. Particularly useful resin for investment casting applications include EnvisionTEC's Easy Cast EC500 resin and MadeSolid FireCast resin.

Additional Resin Ingredients.

The liquid resin or polymerizable material can have solid particles suspended or dispersed therein. Any suitable solid particle can be used, depending upon the end product being fabricated. The particles can be metallic, organic/polymeric, inorganic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can be of any suitable size (for example, ranging from 1 nm to 20 µm average diameter).

The particles can comprise an active agent or detectable compound as described below, though these may also be provided dissolved/solubilized in the liquid resin as also discussed below. For example, magnetic or paramagnetic particles or nanoparticles can be employed.

The liquid resin can have additional ingredients solubilized therein, including pigments, dyes, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Non-Reactive Light Absorbers.

In some embodiments, polymerizable liquids for carrying out the present invention include a non-reactive pigment or dye that absorbs light, particularly UV light. Suitable examples of such light absorbers include, but are not limited to: (i) titanium dioxide (e.g., included in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a hydroxybenzophenone, hydroxyphenylbenzotriazole, oxanilide, benzophenone, hydroxypenyltriazine, and/or benzotriazole ultraviolet light absorber (e.g., Mayzo BLS 1326) (e.g., included in an amount of 0.001 or 0.005 to 1, 2 or 4 percent by weight). Examples of suitable organic ultraviolet light absorbers include, but are not limited to, those described in U.S. Pat. Nos. 3,213,058; 6,916,867; 7,157,586; and 7,695,643, the disclosures of which are incorporated herein by reference.

Inhibitors of Polymerization.

Inhibitors or polymerization inhibitors for use in the present invention may be in the form of a liquid or a gas. In some embodiments, gas inhibitors are preferred. The specific inhibitor will depend upon the monomer being polymerized and the polymerization reaction. For free radical polymerization monomers, the inhibitor can conveniently be oxygen, which can be provided in the form of a gas such as air, a gas enriched in oxygen (optionally but in some embodiments preferably containing additional inert gases to reduce combustibility thereof), or in some embodiments pure oxygen gas. In alternate embodiments, such as where the monomer is polymerized by photoacid generator initiator, the inhibitor can be a base such as ammonia, trace amines (e.g. methyl amine, ethyl amine, di and trialkyl amines such as dimethyl amine, diethyl amine, trimethyl amine, triethyl amine, etc.), or carbon dioxide, including mixtures or combinations thereof.

Polymerizable Liquids Carrying Live Cells.

In some embodiments, the polymerizable liquid may carry live cells as "particles" therein. Such polymerizable liquids are generally aqueous, and may be oxygenated, and may be considered as "emulsions" where the live cells are the discrete phase. Suitable live cells may be plant cells (e.g., monocot, dicot), animal cells (e g., mammalian, avian, amphibian, reptile cells), microbial cells (e.g., prokaryote, eukaryote, protozoal, etc.), etc. The cells may be differentiated cells from or corresponding to any type of tissue (e.g., blood, cartilage, bone, muscle, endocrine gland, exocrine gland, epithelial, endothelial, etc.), or may be undifferentiated cells such as stem cells or progenitor cells. In such embodiments the polymerizable liquid can be one that forms a hydrogel, including but not limited to those described in U.S. Pat. Nos. 7,651,683; 7,651,682; 7,556,490; 6,602,975; 5,836,313; etc.

In some embodiments, polymerizable liquids used in the present invention include a non-reactive pigment or dye. Examples include, but are not limited to, (i) titanium dioxide (e.g., in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a hydroxybenzophenone, hydroxyphenylbenzotriazole, oxanilide, benzophenone, hydroxypenyltriazine, and/or benzotriazole ultraviolet light absorber (e.g., in an amount of 0.001 or 0.005 to 1, 2 or 4 percent by weight).

Microwave Absorbing Materials.

In some embodiments, the polymerizable liquid can include a microwave absorbing material, as discussed further below.

II. Dual Hardening Polymerizable Liquids: Part B

As noted above, in some embodiments of the invention, the polymerizable liquid comprises a first light polymerizable component (sometimes referred to as "Part A" herein) and a second component that solidifies by another mechanism, or in a different manner from, the first component (sometimes referred to as "Part B" herein), typically by further reacting, polymerizing, or chain extending. Numerous embodiments thereof may be carried out. In the following, note that, where particular acrylates such as methacrylates are described, other acrylates may also be used.

Part A Chemistry.

As noted above, in some embodiments of the present invention, a resin will have a first component, termed "Part A." Part A comprises or consists of a mix of monomers and/or prepolymers that can be polymerized by exposure to actinic radiation or light. This resin can have a functionality of 2 or higher (though a resin with a functionality of 1 can also be used when the polymer does not dissolve in its monomer). A purpose of Part A is to "lock" the shape of the object being formed or create a scaffold for the one or more additional components (e.g., Part B). Importantly, Part A is present at or above the minimum quantity needed to maintain the shape of the object being formed after the initial solidification. In some embodiments, this amount corresponds to less than ten, twenty, or thirty percent by weight of the total resin (polymerizable liquid) composition.

In some embodiments, Part A can react to form a cross-linked polymer network or a solid homopolymer.

Examples of reactive end groups suitable for Part A constituents, monomers, or prepolymers include, but are not limited to: acrylates, methacrylates, α-olefins, N-vinyls, acrylamides, methacrylamides, styrenics, epoxides, thiols, 1,3-dienes, vinyl halides, acrylonitriles, vinyl esters, maleimides, and vinyl ethers.

An aspect of the solidification of Part A is that it provides a scaffold in which a second reactive resin component, termed "Part B," can solidify during a second step (which may occur concurrently with or following the solidification of Part A). This secondary reaction preferably occurs without significantly distorting the original shape defined during the solidification of Part A. Alternative approaches would lead to a distortion in the original shape in a desired manner.

In particular embodiments, when used in the methods and apparatus described herein, the solidification of Part A is continuously inhibited during printing within a certain region, by oxygen or amines or other reactive species, to form a liquid interface between the solidified part and an inhibitor-permeable film or window (e.g., is carried out by continuous liquid interface printing).

Part B Chemistry.

Part B may comprise, consist of or consist essentially of a mix of monomers and/or prepolymers that possess reactive end groups that participate in a second solidification reaction after the Part A solidification reaction. In some embodiments, Part B could be added simultaneously to Part A so it is present during the exposure to actinide radiation, or Part B could be infused into the object made during the 3D printing process in a subsequent step. Examples of methods used to solidify Part B include, but are not limited to, contacting the object or scaffold to heat, water or water vapor, light at a different wavelength than that at which Part A is cured, catalysts, (with or without additional heat), evaporation of a solvent from the polymerizable liquid (e.g., using heat, vacuum, or a combination thereof), microwave irradiation, etc., including combinations thereof.

Examples of suitable reactive end group pairs suitable for Part B constituents, monomers or prepolymers include, but are not limited to: epoxy/amine, epoxy/hydroxyl, oxetane/amine, oxetane/alcohol, isocyanate*/hydroxyl, isocyanate*/amine, isocyanate/carboxylic acid, anhydride/amine, amine/carboxylic acid, amine/ester, hydroxyl/carboxylic acid, hydroxyl/acid chloride, amine/acid chloride, vinyl/Si—H (hydrosilylation), Si—Cl/hydroxyl, Si—Cl/amine, hydroxyl/aldehyde, amine/aldehyde, hydroxymethyl or alkoxymethyl amide/alcohol, aminoplast, alkyne/azide (also known as one embodiment of "Click Chemistry," along with additional reactions including thiolene, Michael additions, Diels-Alder reactions, nucleophilic substitution reactions, etc.), alkene/sulfur (polybutadiene vulcanization), alkene/thiol, alkyne/thiol, hydroxyl/halide, isocyanate*/water (polyurethane foams), Si—OH/hydroxyl, Si—OH/water, Si—OH/Si—H (tin catalyzed silicone), Si—OH/Si—OH (tin catalyzed silicone), perfluorovinyl (coupling to form perfluorocyclobutane), etc., where *isocyanates include protected isocyanates (e.g. oximes), diene/dienophiles for Diels-Alder reactions, olefin metathesis polymerization, olefin polymerization using Ziegler-Natta catalysis, ring-opening polymerization (including ring-opening olefin metathesis polymerization, lactams, lactones, siloxanes, epoxides, cyclic ethers, imines, cyclic acetals, etc.), etc.

Other reactive chemistries suitable for Part B will be recognizable by those skilled in the art. Part B components useful for the formation of polymers described in "Concise Polymeric Materials Encyclopedia" and the "Encyclopedia of Polymer Science and Technology" are hereby incorporated by reference.

Elastomers.

A particularly useful embodiment for implementing the invention is for the formation of elastomers. Tough, high-elongation elastomers are difficult to achieve using only liquid UV-curable precursors. However, there exist many thermally cured materials (polyurethanes, silicones, natural rubber) that result in tough, high-elongation elastomers after curing. These thermally curable elastomers on their own are generally incompatible with most 3D printing techniques.

In embodiments of the current invention, small amounts (e.g., less than 20 percent by weight) of a low-viscosity UV curable material (Part A) are blended with thermally-curable precursors to form (preferably tough) elastomers (e.g. polyurethanes, polyureas, or copolymers thereof (e.g., poly(urethane-urea), and silicones) (Part B). The UV curable component is used to solidify an object into the desired shape using 3D printing as described herein and provides a scaffold for the elastomer precursors in the polymerizable liquid. The object can then be heated after printing, thereby activating the second component, resulting in an object comprising the elastomer.

Adhesion of Formed Objects.

In some embodiments, it may be useful to define the shapes of multiple objects using the solidification of Part A, align those objects in a particular configuration, such that there is a hermetic seal between the objects, then activate the secondary solidification of Part B. In this manner, strong adhesion between parts can be achieved during production. A particularly useful example may be in the formation and adhesion of sneaker components.

Fusion of Particles as Part B.

In some embodiments, "Part B" may simply consist of small particles of a pre-formed polymer. After the solidification of Part A, the object may be heated above the glass transition temperature of Part B in order to fuse the entrapped polymeric particles.

Evaporation of Solvent as Part B.

In some embodiments, "Part B" may consist of a preformed polymer dissolved in a solvent. After the solidification of Part A into the desired object, the object is subjected to a process (e.g., heat+vacuum) that allows for evaporation of the solvent for Part B, thereby solidifying Part B.

Thermally Cleavable End Groups.

In some embodiments, the reactive chemistries in Part A can be thermally cleaved to generate a new reactive species after the solidification of Part A. The newly formed reactive species can further react with Part B in a secondary solidification. An exemplary system is described by Velankar, Pezos and Cooper, *Journal of Applied Polymer Science*, 62, 1361-1376 (1996). Here, after UV-curing, the acrylate/methacrylate groups in the formed object are thermally cleaved to generated diisocyanate prepolymers that further react with blended chain-extender to give high molecular weight polyurethanes/polyureas within the original cured material or scaffold. Such systems are, in general, dual-hardening systems that employ blocked or reactive blocked prepolymers, as discussed in greater detail below. It may be noted that later work indicates that the thermal cleavage above is actually a displacement reaction of the chain extender (usually a diamine) with the hindered urea, giving the final polyurethanes/polyureas without generating isocyanate intermediates.

Methods of Mixing Components.

In some embodiments, the components may be mixed in a continuous manner prior to being introduced to the printer build plate. This may be done using multi-barrel syringes and mixing nozzles. For example, Part A may comprise or consist of a UV-curable di(meth)acrylate resin, Part B may comprise or consist of a diisocyanate prepolymer and a polyol mixture. The polyol can be blended together in one barrel with Part A and remain unreacted. A second syringe barrel would contain the diisocyanate of Part B. In this manner, the material can be stored without worry of "Part B" solidifying prematurely. Additionally, when the resin is introduced to the printer in this fashion, a constant time is defined between mixing of all components and solidification of Part A.

Other Additive Manufacturing Techniques.

It will be clear to those skilled in the art that the materials described in the current invention will be useful in other additive manufacturing techniques including fused deposition modeling (FDM), solid laser sintering (SLS), and ink-jet methods. For example, a melt-processed acrylonitrile-butadiene-styrene resin may be formulated with a second UV-curable component that can be activated after the object is formed by FDM. New mechanical properties could be achieved in this manner. In another alternative, melt-processed unvulcanized rubber is mixed with a vulcanizing agent such as sulfur or peroxide, and the shape set through FDM, then followed by a continuation of vulcanization.

III. Dual Hardening Polymerizable Liquids Employing Blocked Constituents and Thermally Cleavable Blocking Groups In some embodiments, where the solidifying and/or curing step is carried out subsequent to the irradiating step (e.g., by heating or microwave irradiating); the solidifying and/or curing step is carried out under conditions in which the solid polymer scaffold degrades and forms a constituent necessary for the polymerization of the second component (e.g., a constituent such as (i) a prepolymer, (ii) a diisocyanate or polyisocyanate, and/or (iii) a polyol and/or diol, where the second component comprises precursors to a polyurethane/polyurea resin). Such methods may involve the use of reactive or non-reactive blocking groups on or coupled to a constituent of the first component, such that the constituent participates in the first hardening or solidifying event, and when de-protected (yielding free constituent and free blocking groups or blocking agents) generates a free constituent that can participate in the second solidifying and/or curing event. Examples of such dual cure resins include, but are not limited to, those set forth in Jason P. Rolland et al., Three-dimensional objects produced from materials having multiple mechanisms of hardening, US Patent Application Pub. No. 2016016077 (9 Jun. 2016) (also published as PCT Patent Application Pub. No. WO 2015/200189); Jason P. Rolland et al., Methods of producing three-dimensional objects from materials having multiple mechanisms of hardening US Patent Application Pub. No. 20160136889 (19 May 2016) (also published as PCT Patent Application Pub. No. WO 2015/200173); Jason P. Rolland et al., Methods of producing polyurethane three-dimensional objects from materials having multiple mechanisms of hardening US Patent Application Pub. No. 20160137838 (19 May 2016) (also published as PCT Patent Application Pub. No. WO 2015/200179); and Jason P. Rolland et al., Polyurethane resins having multiple mechanisms of hardening for use in producing three-dimensional objects US Patent Application Pub. No. 20160137839 (19 May 2016) (also published as PCT Patent Application Pub. No. WO 2015/200201), the disclosures of all of which are incorporated by reference herein in their entirety.

IV. Microwave Absorbing Materials for Incorporation into Support Media and/or Resin Microwave absorbing, or microwave dissipative, materials are generally particles, and in some cases nanoparticles. Such materials are known. See, e.g., U.S. Pat. No. 5,189,078; see also U.S. Pat. Nos. 6,566,414, 7,273,580, 4,626,642; and PCT Patent Application WO 2013/021039. Particular examples of suitable materials include, but are not limited to, iron, tungsten, chromium, aluminum, copper, titanium, titanium nitride, molybdenum disilicide, nickel, and carbon (including graphite). Suitable spherical substrates include ceramics (including glass), metals and polymers. In some embodiments, the particles may range in diameter from 0.1 to 150 microns. One type of particles is acicular magnetic metallic polycrystalline filaments which have an average length of about 10 microns or less, diameters of about 0.1 micron or more, and aspect ratios between 50:1 and 10:1, Other suitable particles are based on iron oxide filaments:ferric oxide itself; ferrosoferric oxide having a thin surface layer of adsorbed cobalt, with x between 1.0 and 1.5 and the surface cobalt providing one to ten percent of the particle weight, in acicular form of length 0.4 micron and aspect ratio about 6:1 to 8:1; or similarly shaped and sized ferric oxide filaments having a thin surface layer of adsorbed cobalt and doubly ionized iron atoms. In some embodiments, the microwave absorbing material may comprise iron nanoparticles. See, e.g., X. F. Sun et al., *Study on the Properties of Microwave Curing Epoxy Resin/Nano-Fe Composite Materials*, Applied Mechanics and Materials 26-28, pp. 356-359 (2010). In some embodiments, the microwave absorbing material may comprise an inorganic pigment and/or filler. See, e.g., D. Kersting and H. Wiebeck, *Evaluation of the use of inorganic pigments and fillers in cure of epoxy resins by microwave irradiation*, 2013 International Nuclear Atlantic Conference—INAC 2013.

In some embodiments, microwave absorbing materials such as described above may be included in the resin composition, for both the photopolymerization step and the microwave/heat polymerization step, in any suitable amount, typically from 0.1 or 1 to 5, 10 or 20 percent by weight, or more.

In some embodiments, microwave absorbing materials such as described above may be included in a particulate support for the microwave/heat polymerization step, with the particulate support wholly comprising microwave absorbing materials, and/or admixed with other particulate support materials such as described above.

In some embodiments, hollow organic or inorganic particles filled with a microwave absorbing material are used as the support media. For example, organic polymer particles such as cured silicone rubber particles containing carbon, such as carbon black, fullerenes such as graphene, spherical carbon nanoparticles and carbon nanotubes (including single or multi-walled carbon nanotubes), etc., are useful as a support media, alone or mixed with other support media as described above.

In some embodiments, a liquid support media containing one or more microwave absorbing material may be used. Such a liquid support media may have a density greater than, the same as, or less than the object being supported. Such a liquid support media can be aqueous or non-aqueous, hydrophilic, hydrophobic, amphipathic, etc. (or combination thereof), and provided in the form of a solution, emulsion, suspension, dispersion, etc. The liquid support media can be viscous under the conditions in which the object is placed in contact therewith immediately before the heating or curing step is carried out (e.g., a viscosity of 100, 500, 1,000, or 5,000 centipoise, or more). The liquid support media can be in the form of a gel (including frangible or breakable gels; see, e.g., U.S. Pat. Nos. 8,003,001 and 6,201,050). For example, the liquid support may be comprised of a silicone fluid or oil carrying a microwave absorbing material as described above, such as carbon black.

V. Methods of Making Three-Dimensional Intermediate

The three-dimensional intermediate is preferably formed by additive manufacturing, examples of which include bottom-up additive manufacturing, top-down additive manufacturing, and inkjet 3D printing. Such methods are known and described in, for example, U.S. Pat. No. 5,236,637 to Hull, U.S. Pat. No. 7,438,846 to John, U.S. Pat. Nos. 5,391,072 and 5,529,473 to Lawton, U.S. Pat. No. 7,892,474 to Shkolnik, U.S. Pat. No. 8,110,135 to El-Siblani, U.S. Patent Application Publication Nos. 2013/0292862 to Joyce, 2013/0295212 to Chen et al., and PCT Application Publication No. WO 2015/164234 to Robeson et al. The disclosures of these patents and applications are incorporated by reference herein in their entirety.

In general, bottom-up three-dimensional fabrication is carried out by:

(a) providing a carrier and an optically transparent member having a build surface, said carrier and said build surface defining a build region therebetween;

(b) filling said build region with a polymerizable liquid, said polymerizable liquid comprising a mixture of (i) a light (typically ultraviolet light) polymerizable liquid first component, and (ii) a second solidifiable component of the dual cure system;

(c) irradiating said build region with light through said optically transparent member to form a solid polymer scaffold from said first component and also advancing said carrier away from said build surface to form a three-dimensional intermediate having the same shape as, or a shape to be imparted to, said three-dimensional object and containing said second solidifiable component (e.g., a second reactive component) carried in said scaffold in unsolidified and/or uncured form.

In some embodiments of bottom-up three-dimensional fabrication as implemented in the context of the present invention, the build surface is stationary during the formation of the three-dimensional intermediate; in other embodiments of bottom-up three-dimensional fabrication as implemented in the context of the present invention, the build surface is tilted, slid, flexed and peeled, and/or otherwise released from the growing three-dimensional intermediate, usually repeatedly, during formation of the three-dimensional intermediate.

In some embodiments of bottom-up three-dimensional fabrication as carried out in the context of the present invention, the polymerizable liquid (or resin) is maintained in liquid contact with both the growing three-dimensional intermediate and the build surface during both the filling and irradiating steps, during fabrication of some of, a major portion of, or all of the three-dimensional intermediate.

In some embodiments of bottom-up three-dimensional fabrication as carried out in the context of the present invention, the growing three-dimensional intermediate is fabricated in a layerless manner (e.g., through multiple exposures or "slices" of patterned actinic radiation or light) during at least a portion of the formation of the three-dimensional intermediate.

In some embodiments of bottom-up three-dimensional fabrication as carried out in the context of the present invention, the growing three-dimensional intermediate is fabricated in a layer-by-layer manner (e.g., through multiple exposures or "slices" of patterned actinic radiation or light), during at least a portion of the formation of the three-dimensional intermediate.

From the foregoing it will be appreciated that, in some embodiments of bottom-up three-dimensional fabrication as carried out in the context of the present invention, the growing three-dimensional intermediate is fabricated in a layerless manner during the formation of at least one portion thereof, and that same growing three-dimensional intermediate is fabricated in a layer-by-layer manner during the formation of at least one other portion thereof. Thus, operating mode may be changed once, or on multiple occasions, between layerless fabrication and layer-by-layer fabrication, as desired by operating conditions such as part geometry.

In preferred embodiments, the intermediate is formed by continuous liquid interface production (CLIP). CLIP is known and described in, for example, PCT Application Nos. PCT/US2014/015486 (also published as US 2015/0102532); PCT/US2014/015506 (also published as US 2015/0097315), PCT/US2014/015497 (also published as US 2015/0097316), and in J. Tumbleston, D. Shirvanyants, N. Ermoshkin et al., Continuous liquid interface production of 3D Objects, *Science* 347, 1349-1352 (published online 16 Mar. 2015). In some embodiments, CLIP employs features of a bottom-up three-dimensional fabrication as described above, but the irradiating and/or advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between said dead zone and said solid polymer and in contact with each thereof, said gradient of polymerization zone comprising said first component in partially-cured form. In some embodiments of CLIP, the optically transparent member comprises a semipermeable member (e.g., a fluoropolymer), and said continuously maintaining a dead zone is carried out by feeding an inhibitor of polymerization through said optically transparent member, thereby creating a gradient of inhibitor in said dead zone and optionally in at least a portion of said gradient of polymerization zone.

In some embodiments, the stable liquid interface may be achieved by other techniques, such as by providing an immiscible liquid as the build surface between the polymerizable liquid and the optically transparent member, by feeding a lubricant to the build surface (e.g., through an optically transparent member which is semipermeable thereto, and/or serves as a reservoir thereof), etc.

While the dead zone and the gradient of polymerization zone do not have a strict boundary therebetween (in those locations where the two meet), the thickness of the gradient of polymerization zone is in some embodiments at least as great as the thickness of the dead zone. Thus, in some embodiments, the dead zone has a thickness of from 0.01, 0.1, 1, 2, or 10 microns up to 100, 200 or 400 microns, or more, and/or the gradient of polymerization zone and the dead zone together have a thickness of from 1 or 2 microns up to 400, 600, or 1000 microns, or more. Thus the gradient of polymerization zone may be thick or thin depending on the particular process conditions at that time. Where the gradient of polymerization zone is thin, it may also be described as an active surface on the bottom of the growing three-dimensional object, with which monomers can react and continue to form growing polymer chains therewith. In some embodiments, the gradient of polymerization zone, or active surface, is maintained (while polymerizing steps continue) for a time of at least 5, 10, 15, 20 or 30 seconds, up to 5, 10, 15 or 20 minutes or more, or until completion of the three-dimensional intermediate.

Inhibitors, or polymerization inhibitors, for use in the present invention may be in the form of a liquid or a gas. In some embodiments, gas inhibitors are preferred. In some embodiments, liquid inhibitors such as oils or lubricants may be employed. The specific inhibitor will depend upon the monomer being polymerized and the polymerization reaction. For free radical polymerization monomers, the inhibitor can conveniently be oxygen, which can be provided in the form of a gas such as air, a gas enriched in oxygen (optionally but in some embodiments preferably containing additional inert gases to reduce combustibility thereof), or in some embodiments pure oxygen gas. In alternate embodiments, such as where the monomer is polymerized by photoacid generator initiator, the inhibitor can be a base such as ammonia, trace amines (e.g. methyl amine, ethyl amine, di and trialkyl amines such as dimethyl amine, diethyl amine, trimethyl amine, triethyl amine, etc.), or carbon dioxide, including mixtures or combinations thereof.

The method may further comprise the step of disrupting the gradient of polymerization zone for a time sufficient to form a cleavage line in the three-dimensional object (e.g., at a predetermined desired location for intentional cleavage, or at a location in the object where prevention of cleavage or reduction of cleavage is non-critical), and then reinstating the gradient of polymerization zone (e.g. by pausing, and resuming, the advancing step, increasing, then decreasing, the intensity of irradiation, and combinations thereof).

CLIP may be carried out in different operating modes (that is, different manners of advancing the carrier and build surface away from one another), including continuous, intermittent, reciprocal, and combinations thereof.

Thus in some embodiments, the advancing step is carried out continuously, at a uniform or variable rate, with either constant or intermittent illumination or exposure of the build area to the light source.

In other embodiments, the advancing step is carried out sequentially in uniform increments (e.g., of from 0.1 or 1 microns, up to 10 or 100 microns, or more) for each step or increment. In some embodiments, the advancing step is carried out sequentially in variable increments (e.g., each increment ranging from 0.1 or 1 microns, up to 10 or 100 microns, or more) for each step or increment. The size of the increment, along with the rate of advancing, will depend in part upon factors such as temperature, pressure, structure of the article being produced (e.g., size, density, complexity, configuration, etc.).

In some embodiments, the rate of advance (whether carried out sequentially or continuously) is from about 0.1, 1, or 10 microns per second, up to about to 100, 1,000, or 10,000 microns per second, again depending again depending on factors such as temperature, pressure, structure of the article being produced, intensity of radiation, etc.

In still other embodiments, the carrier is vertically reciprocated with respect to the build surface to enhance or speed the refilling of the build region with the polymerizable liquid. In some embodiments, the vertically reciprocating step, which comprises an upstroke and a downstroke, is carried out with the distance of travel of the upstroke being greater than the distance of travel of the downstroke, to thereby concurrently carry out the advancing step (that is, driving the carrier away from the build plate in the Z dimension) in part or in whole.

In some embodiments, the solidifiable or polymerizable liquid is changed at least once during the method with a subsequent solidifiable or polymerizable liquid (e.g., by exchanging a "window" or build plate with an associated reservoir); optionally where the subsequent solidifiable or polymerizable liquid is cross-reactive with each previous solidifiable or polymerizable liquid during the subsequent curing, to form an object having a plurality of structural segments covalently coupled to one another, each structural segment having different structural (e.g., tensile) properties (e.g., a rigid nozzle segment covalently coupled to a flexible hose segment).

While the present invention is described primarily with reference to bottom-up additive manufacturing techniques, it will be clear to those skilled in the art that the materials described in the current invention will be useful in other additive manufacturing techniques including ink-jet methods.

Once produced, the three-dimensional intermediate may be separated from the carrier (or the carrier separated from the apparatus), optionally washed, support structures or elements optionally removed, any other modifications optionally made (cutting, welding, adhesively bonding, joining, grinding, drilling, etc.), and the intermediate then further cured as described below. Of course, additional modifications may also be made following the heating and/or microwave irradiating step.

Washing may be carried out with any suitable organic or aqueous wash liquid, or combination thereof, including solutions, suspensions, emulsions, microemulsions, etc. Examples of suitable wash liquids include, but are not limited to water, alcohols (e.g., methanol, ethanol, isopropanol, etc.), benzene, toluene, etc. Such wash solutions may optionally contain additional constituents such as surfactants, etc. An example wash liquid is a 50:50 (volume:volume) solution of water and isopropanol.

VI. Supporting and Second Curing of Intermediate to Produce Product

The support may be of any material, including solids, liquids, and gels (including combinations of the foregoing such as slurries), that can be applied to the intermediate and subsequently separated from the product after the second cure (e.g., after heat and/or irradiation). Thus, in some embodiments the support material may be a solid particulate or inert powder. In other embodiments the support material is in the form of a liquid. In some embodiments, the liquid is an oil, such as a vegetable oil (e.g., canola oil, soybean oil, peanut oil, etc.) In preferred embodiments, the liquid is a viscous liquid that can be heated to the temperature at which the secondary solidification occurs. In further embodiments the support material is in the form of a gel which is stable at the secondary cure temperature.

In some embodiments, a particulate support or inert powder is used to carry out the present invention. See, e.g., U.S. Pat. No. 8,991,211. In general, the composition of the inert powder article is chosen to avoid a chemical reaction between the inert powder and the intermediate article during the curing step. The composition of the inert powder is preferentially water-soluble. It is preferred that the thermal expansion coefficients of the intermediate object and inert powder compositions be similar so as to minimize the thermal stresses on the nascent article during heating and on the cured article during cooling. Examples of inert powder compositions include inorganic salts in particulate form, including but not limited to sodium chloride, sodium bicarbonate, sodium carbonate, sodium sulfate, sodium sulfite, sodium iodide, sodium bromide, magnesium sulfate, magnesium carbonate, magnesium bromide, magnesium iodide, calcium chloride, calcium carbonate, calcium bromide, calcium sulfate, calcium iodide, potassium carbonate, potassium chloride, potassium bromide, potassium iodide, potassium nitrate, ammonium sulfate, ammonium chloride, ammonium bromide, ammonium iodide, and combinations thereof.

The inert powder may also be selected to have sufficient flowability to accommodate movement of the nascent article due to expansion or shrinkage as it is heated and sintered so as to avoid dimensional distortion of the nascent article due to sagging. The inert powder may also have sufficient flowability to accommodate the shrinkage of the sintered article as it is cooled back to room temperature. It is preferred that the inert powder be able to flow out of the internal cavities and/or passages during sintering and cooling so as to eliminate or minimize distortions that otherwise could occur due to cavities and/or passages shrinking around trapped inert powder. To enhance flowability, the inert powder may have a spherical or near-spherical shape and its particles have smooth surfaces. The inert powder may have a particle size (as measured by the sieve analysis method) that is in the range of 0-200 micrometers, with an average particle size that is in the range of 20-150 micrometers. In some embodiments, the particle size should be in the range of 20-125 micrometers, and the average particle size in the range of 50-100 micrometers.

In general, the particulate support is applied to the intermediate product by any suitable technique, such as filling, spraying, spooning, plowing, shoveling, etc., including combinations thereof. Preferably, the part, and the particulate support, are all dry. The intermediate part and particulate support may be placed in a plan, tray, or other carrier vessel. All surfaces of the intermediate part may be in contact to the particulate support, or some surfaces thereof left unsupported (or free of contact to the particulate support), depending upon the geometry and composition of the intermediate part.

Orientation and fill indicators, such as lines, ridges, or other indicia, may be formed on the part itself to indicate how it should be positioned in the particulate support for subsequent cure, and/or how the particulate support should be packed or filled around the intermediate part.

The support may comprise microwave absorbing materials as described above, alone or admixed with other materials as described above (e.g., insoluble microwave absorbing particles, admixed with soluble or insoluble inert materials).

Once supported (fully or partially), the intermediate object and the particulate support may be further processed to effect the second cure. The second cure may be carried out by any suitable technique, but typically is carried out by heating and/or microwave irradiating.

Microwave irradiation of the object for heating may be carried out at any suitable frequency, typically from 300 MHz to 300 GHz. In some embodiments, microwave irradiation of the object is carried out at a frequency of from 2,000 MHz to 4,000 MHz (2,450 MHz typically being employed in small or residential microwave ovens), or at a frequency of from 500 MHz to 1,500 MHz (915 MHz typically being employed in larger commercial or industrial microwave ovens).

The heating step may be carried out by multiple heating methods as is known in the art (e.g., a combination of two or more of radiant heating, microwave irradiating, convection heating, conduction heating, etc.)

VII. Fabrication Products

Three-dimensional products produced by the methods and processes of the present invention may be final, finished or substantially finished products, or may be intermediate products for which further manufacturing steps such as surface treatment, laser cutting, electric discharge machining, etc., is intended. Intermediate products include products for which further additive manufacturing, in the same or a different apparatus, may be carried out. For example, a fault or cleavage line may be introduced deliberately into an ongoing "build" by disrupting, and then reinstating, the gradient of polymerization zone, to terminate one region of the finished product, or simply because a particular region of the finished product or "build" is less fragile than others.

Numerous different products can be made by the methods and apparatus of the present invention, including both large-scale models or prototypes, small custom products, miniature or microminiature products or devices, etc. Examples include, but are not limited to, medical devices and implantable medical devices such as stents, drug delivery depots, functional structures, microneedle arrays, fibers and rods such as waveguides, micromechanical devices, microfluidic devices, etc.

Thus in some embodiments the product can have a height of from 0.1 or 1 millimeters up to 10 or 100 millimeters, or more, and/or a maximum width of from 0.1 or 1 millimeters up to 10 or 100 millimeters, or more. In other embodiments, the product can have a height of from 10 or 100 nanometers up to 10 or 100 microns, or more, and/or a maximum width of from 10 or 100 nanometers up to 10 or 100 microns, or more. These are examples only; maximum size and width depends on the architecture of the particular device and the resolution of the light source and can be adjusted depending upon the particular goal of the embodiment or article being fabricated.

In some embodiments, the ratio of height to width of the product is at least 2:1, 10:1, 50:1, or 100:1, or more, or a width to height ratio of 1:1, 10:1, 50:1, or 100:1, or more.

In some embodiments, the product has at least one, or a plurality of, pores or channels formed therein, as discussed further below.

The processes described herein can produce products with a variety of different properties. Hence in some embodiments the products are rigid; in other embodiments the products are flexible or resilient. In some embodiments, the products are a solid; in other embodiments, the products are a gel such as a hydrogel. In some embodiments, the products have a shape memory (that is, return substantially to a previous shape after being deformed, so long as they are not deformed to the point of structural failure). In some embodiments, the products are unitary (that is, formed of a single polymerizable liquid); in some embodiments, the products are composites (that is, formed of two or more different polymerizable liquids). Particular properties will be determined by factors such as the choice of polymerizable liquid(s) employed.

In some embodiments, the product or article made has at least one overhanging feature (or "overhang"), such as a bridging element between two supporting bodies, or a cantilevered element projecting from one substantially vertical support body. Because of the unidirectional, continuous nature of some embodiments of the present processes, the problem of fault or cleavage lines that form between layers when each layer is polymerized to substantial completion and a substantial time interval occurs before the next pattern is exposed, is substantially reduced. Hence, in some embodiments the methods are particularly advantageous in reducing, or eliminating, the number of support structures for such overhangs that are fabricated concurrently with the article.

The above methods, structures, materials, compositions and properties may be used to 3D print a virtually unlimited number of products. Examples include, but are not limited to, medical devices and implantable medical devices such as stents, drug delivery depots, catheters, bladder, breast implants, testicle implants, pectoral implants, eye implants, contact lenses, dental aligners, microfluidics, seals, shrouds, and other applications requiring high biocompatibility, functional structures, microneedle arrays, fibers, rods, waveguides, micromechanical devices, microfluidic devices; fasteners; electronic device housings; gears, propellers, and impellers; wheels, mechanical device housings; tools; structural elements; hinges including living hinges; boat and watercraft hulls and decks; wheels; bottles, jars and other containers; pipes, liquid tubes and connectors; foot-ware soles, heels, innersoles and midsoles; bushings, o-rings and gaskets; shock absorbers, funnel/hose assembly, cushions; electronic device housings; shin guards, athletic cups, knee pads, elbow pads, foam liners, padding or inserts, helmets, helmet straps, head gear, shoe cleats, gloves, other wearable or athletic equipment, brushes, combs, rings, jewelry, buttons, snaps, fasteners, watch bands or watch housings, mobile phone or tablet casings or housings, computer keyboards or keyboard buttons or components, remote control buttons or components, auto dashboard components, buttons, dials, auto body parts, paneling, other automotive, aircraft or boat parts, cookware, bakeware, kitchen utensils, steamers and any number of other 3D objects. The universe of useful 3D products that may be formed is greatly expanded by the ability to impart a wide range of shapes and properties, including elastomeric properties, through the use of multiple methods of hardening such as dual cure where a shape can be locked-in using continuous liquid interface printing and subsequent thermal or other curing can be used to provide elastomeric or other desired properties. Any of the above described structures, materials and properties can be combined to form 3D objects including the 3D formed products described above. These are examples only and any number of other 3D objects can be formed using the methods and materials described herein.

Embodiments of the present invention are explained in greater detail in the following non-limiting examples.

EXAMPLE

Heat Cure of an Intermediate Part in Particulate Sodium Chloride Support

A polyurethane dual cure resin is used to produce a three-dimensional part by first forming an intermediate part by Continuous Liquid Interface Production (CLIP).

After being formed by CLIP, the intermediate part is separated from its carrier and washed in isopropyl alcohol (IPA) or, alternatively, an aqueous cleaner such as Rapid Rinse Prototype cleaner by Green Power Chemical, to remove surface resin. Support elements are removed from the part with clippers or razor blades. The part is placed in IPA and scrubbed with a soft bristle brush on all surfaces, with an additional focus on corners and difficult to reach areas. In the case of long hollow cylindrical geometries, a pipe cleaner may be utilized to remove excess resin.

The entire part is then sprayed with clean IPA and the part blown dry with pressurized air.

Once dry, the part is placed in a bed of SALTWORKS PURE OCEAN® powdered sea salt (SaltWorks, Inc. 16240 Wood-Red Rd NE, Woodinville, Wash. 98072 USA) and covered generously with additional powdered salt, so that the entire part is fully engulfed, with all surfaces fully in contact with the salt.

The part, covered in salt, is then placed in an oven and baked for a sufficient amount of time that all salt heats to oven temperature and allows for full thermal cure of the part to occur. (Testing may be necessary to account for the time the thermal mass of salt requires to heat up to oven temperature. Initial estimates are that one metal 10 in×10 in×5 in pan filled with salt would require an additional 30 min to 1 hr.) The part is then removed from the oven and allowed to cool to room temperature. Of course, the part may be removed from the oven before the part itself reaches oven temperature if it is sufficiently cured beforehand.

Once cool, the part is removed from salt and run under warm water until all salt is dissolved from the surface of the part.

The foregoing is illustrative of the present invention, and is not to be construed as limiting thereof. The invention is defined by the following claims, with equivalents of the claims to be included therein.

That which is claimed is:

1. A method of forming a three-dimensional object, comprising:
   (a) providing a carrier and an optically transparent member having a build surface, said carrier and said build surface defining a build region therebetween;
   (b) filling said build region with a polymerizable liquid, said polymerizable liquid comprising a mixture of (i) a microwave absorbing material, (ii) a light polymerizable liquid first component, and (iii) a second solidifiable component that is different from said first component; and
   (c) irradiating said build region with light through said optically transparent member to form a solid polymer scaffold from said first component and also advancing said carrier away from said build surface to form a three-dimensional intermediate having the same shape as, or a shape to be imparted to, said three-dimensional object and containing said second solidifiable component carried in said scaffold in unsolidified and/or uncured form; then
   (d) supporting said three-dimensional intermediate with a separate support media;
   (e) solidifying and/or curing, said second solidifiable component in said three-dimensional intermediate to form said three-dimensional object in said support media; and then
   (f) separating said support media from said three-dimensional object,
   wherein said support media is a solid particulate and is inert and/or water soluble.

2. The method of claim 1, wherein said support media is flowable.

3. The method of claim 1, wherein said support media comprises a microwave absorbing material.

4. The method of claim 1, wherein said support media is comprised of an inorganic salt.

5. The method of claim 4, wherein said inorganic salt is selected from the group consisting of sodium chloride, sodium bicarbonate, sodium carbonate, sodium sulfate, sodium sulfite, sodium iodide, sodium bromide, magnesium sulfate, magnesium carbonate, magnesium bromide, magnesium iodide, calcium chloride, calcium carbonate, calcium bromide, calcium sulfate, calcium iodide, potassium carbonate, potassium chloride, potassium bromide, potassium iodide, potassium nitrate, ammonium sulfate, ammonium chloride, ammonium bromide, ammonium iodide, and combinations thereof.

6. The method of claim 1, wherein said separating step is carried out by dissolving or solubilizing said support media with water.

7. The method of claim 1, wherein said solidifying and/or curing step (e) is carried out by heating and/or microwave irradiating.

8. The method of claim 1, wherein said three-dimensional intermediate is collapsible, compressible, or elastic.

9. The method of claim 1, wherein said filling and irradiating steps (b) and (c) are carried out by continuous liquid interface production (CLIP).

10. The method of claim 1, wherein said second solidifiable component comprises:
    (i) a polymerizable liquid solubilized in or suspended in said first component;
    (ii) a polymerizable solid suspended in said first component;
    (iii) a polymerizable solid solubilized in said first component; or
    (iv) a polymer solubilized in said first component.

11. The method of claim 1, wherein said polymerizable liquid comprises:
    from 1 or 10 percent by weight to 40, 90 or 99 percent by weight of said first component; and
    from 1, 10 or 60 percent by weight to 90 or 99 percent by weight of said second solidifiable component.

12. The method of claim 1, wherein said solidifying and/or curing step (e) is carried out subsequent to said irradiating step (c) and is carried out by:
    (i) heating said second solidifiable component;
    (ii) irradiating said second solidifiable component with light at a wavelength different from that of the light in said irradiating step (c);
    (iii) contacting said second polymerizable component to water; and/or
    (iv) contacting said second polymerizable component to a catalyst.

13. The method of claim 1, wherein:
    said second solidifiable component comprises precursors to a polyurethane, polyurea, or copolymer thereof, a silicone resin, an epoxy resin, a cyanate ester resin, or a natural rubber; and
    said solidifying and/or curing step is carried out by heating.

14. The method of claim 1, wherein:
    said second solidifiable component comprises precursors to a polyurethane, polyurea, or copolymer thereof, and
    said solidifying and/or curing step is carried out by contacting said second solidifiable component to water.

15. The method of claim 1, wherein said solidifying and/or curing step (e) is carried out under conditions in which said solid polymer scaffold degrades and forms a constituent necessary for the polymerization of said second solidifiable component.

16. The method of claim 1, wherein:
    said second solidifiable component comprises precursors to a polyurethane, polyurea, or copolymer thereof, a silicone resin, a ring-opening metathesis polymerization resin, a click chemistry resin, or a cyanate ester resin, and
    said solidifying and/or curing step is carried out by contacting said second solidifiable component to a polymerization catalyst.

17. The method of claim 1,
    wherein said light polymerizable liquid first component comprises monomers and/or prepolymers that are polymerized by exposure to actinic radiation or light, and
    solidifying said second solidifiable component comprises contacting to heat, water, water vapor, light at a different wavelength than that at which said first component is polymerized, catalysts, evaporation of a solvent from the polymerizable liquid, exposure to microwave irradiation, or a combination thereof.

18. The method of claim 17, wherein said monomers and/or prepolymers comprises reactive end groups selected from the group consisting of acrylates, methacrylates, α-olefins, N-vinyls, acrylamides, methacrylamides, styrenics, epoxides, thiols, 1,3-dienes, vinyl halides, acrylonitriles, vinyl esters, maleimides, vinyl ethers, and combinations thereof.

19. The method of claim 17, wherein said second solidifiable component comprising monomers and/or prepolymers comprises reactive end groups selected from the group consisting of: epoxy/amine, epoxy/hydroxyl, oxetane/amine, oxetane/alcohol, isocyanate/hydroxyl, isocyanate/amine, isocyanate/carboxylic acid, cyanate ester, anhydride/amine, amine/carboxylic acid, amine/ester, hydroxyl/carboxylic acid, hydroxyl/acid chloride, amine/acid chloride, vinyl/Si—H, Si—Cl/hydroxyl, Si—Cl/amine, hydroxyl/aldehyde, amine/aldehyde, hydroxymethyl or alkoxymethyl amide/alcohol, aminoplast, alkyne/azide, click chemistry reactive groups, alkene/sulfur, alkene/thiol, alkyne/thiol, hydroxyl/halide, isocyanate/water, Si—OH/hydroxyl, Si—OH/water, Si—OH/Si—H, Si—OH/Si—OH, perfluorovinyl, diene/dienophiles, olefin metathesis polymerization groups, olefin polymerization groups for Ziegler-Natta catalysis, and ring-opening polymerization groups and mixtures thereof.

20. The method of claim 1, wherein:
said three-dimensional object is comprised of polyurethane, polyurea, or copolymer thereof; and
said polymerizable liquid is comprised of at least one of: (i) a blocked or reactive blocked prepolymer, (ii) a blocked of reactive blocked diisocyante, or (iii) a blocked or reactive blocked diisocyanate chain extender.

21. The method of claim 20, wherein said polymerizable liquid comprises:
(a) a mixture of (i) a blocked or reactive blocked prepolymer, (ii) a chain extender, (iii) a photoinitiator, (iv) optionally a polyol and/or a polyamine, (v) optionally a reactive diluent, (vi) optionally a pigment or dye, and (vii) optionally a filler; or
(b) a mixture of (i) a blocked or reactive blocked diisocyanate, (ii) a polyol and/or polyamine, (iii) a chain extender, (iv) a photoinitiator, (v) optionally a reactive diluent (vi) optionally a pigment or dye, and (vii) optionally a filler; or
(c) a mixture of (i) a polyol and/or polyamine, (ii) a blocked or reactive blocked diisocyanate chain extender, (iii) optionally one or more additional chain extenders, (iv) a photoinitiator, (v) optionally a reactive diluent, (vi) optionally a pigment or dye, and (vii) optionally a filler.

22. The method of claim 1, wherein said three-dimensional object comprises a polymer blend, interpenetrating polymer network, semi-interpenetrating polymer network, or sequential interpenetrating polymer network formed from said first component and said second solidifiable component.

23. The method of claim 1, wherein said three-dimensional object comprises an interpenetrating polymer network (IPN), said interpenetrating polymer network comprising a sol-gel composition, a hydrophobic-hydrophilic IPN, a phenolic resin, a polyimide, a conductive polymer, a natural product-based IPN, a sequential IPN, a semi IPN, a polyolefin, or a combination thereof.

24. The method of claim 1, wherein said irradiating and/or said advancing steps are carried out while also concurrently:
(i) continuously maintaining a dead zone of said polymerizable liquid in contact with said build surface, and
(ii) continuously maintaining a gradient of polymerization zone between said dead zone and said solid polymer scaffold and in contact with each thereof, said gradient of polymerization zone comprising said first component in partially: cured form.

25. The method of claim 24, wherein said optically transparent member comprises a semipermeable member, and said continuously maintaining a dead zone is carried out by feeding an inhibitor of polymerization through said optically transparent member, thereby creating a gradient of inhibitor in said dead zone and optionally in at least a portion of said gradient of polymerization zone.

26. The method of claim 25, wherein said optically transparent member comprises a fluoropolymer.

27. The method of claim 25, wherein:
said first component comprises a free radical polymerizable liquid and said inhibitor comprises oxygen; or
said first component comprises an acid-catalyzed or cationically polymerizable liquid, and said inhibitor comprises a base.

28. The method of claim 1, further comprising vertically reciprocating said carrier with respect to the build surface to enhance or speed the filling of the build region with the polymerizable liquid.

* * * * *

UNITED STATES PATENT AND TRADEMARK OFFICE
CERTIFICATE OF CORRECTION

PATENT NO. : 10,500,786 B2
APPLICATION NO. : 15/626787
DATED : December 10, 2019
INVENTOR(S) : Jason P. Rolland Page 1 of 1

It is certified that error appears in the above-identified patent and that said Letters Patent is hereby corrected as shown below:

In the Claims

Column 24, Line 27, Claim 24:
Please correct "partially: cured" to read -- partially-cured --

Signed and Sealed this
Fifth Day of May, 2020

Andrei Iancu
*Director of the United States Patent and Trademark Office*